US011323340B2

(12) United States Patent
Hira (10) Patent No.: US 11,323,340 B2
(45) Date of Patent: May 3, 2022

(54) PACKET FLOW MONITORING IN SOFTWARE-DEFINED NETWORKING (SDN) ENVIRONMENTS

(71) Applicant: VMware, Inc., Palo Alto, CA (US)

(72) Inventor: Mukesh Hira, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/240,792

(22) Filed: Jan. 7, 2019

(65) Prior Publication Data

US 2020/0220793 A1 Jul. 9, 2020

(51) Int. Cl.
*H04L 12/26* (2006.01)
*H04L 43/026* (2022.01)
*H04L 43/065* (2022.01)

(52) U.S. Cl.
CPC .......... *H04L 43/026* (2013.01); *H04L 43/065* (2013.01); *H04L 2212/00* (2013.01)

(58) Field of Classification Search
None
See application file for complete search history.

(56) References Cited

U.S. PATENT DOCUMENTS

| 6,711,152 | B1 | 3/2004 | Kalmanek, Jr. et al. |
| 7,068,667 | B2 | 6/2006 | Foster et al. |
| 8,671,176 | B1 * | 3/2014 | Kharitonov .............. H04L 45/02 709/219 |
| 10,686,671 | B1 * | 6/2020 | Mozumdar ........... H04L 41/145 |
| 2002/0145981 | A1 | 10/2002 | Klinker et al. |
| 2002/0150229 | A1 | 10/2002 | Riihinen et al. |
| 2007/0283024 | A1 | 12/2007 | Landrum et al. |
| 2011/0302346 | A1 | 12/2011 | Vahdat et al. |
| 2013/0100816 | A1 | 4/2013 | Bergamasco et al. |
| 2014/0047252 | A1 | 2/2014 | Ansari et al. |

(Continued)

FOREIGN PATENT DOCUMENTS

GB 2493710 A 2/2013

OTHER PUBLICATIONS

C. Kim et al., "In-band Network Telemetry (INT)", Jun. 2016 (Year: 2016).*

(Continued)

*Primary Examiner* — Faruk Hamza
*Assistant Examiner* — Cassandra L Decker
(74) *Attorney, Agent, or Firm* — Su IP Consulting (57) ABSTRACT

Example methods are provided a first host to perform packet flow monitoring in a software-defined networking (SDN) environment. One example may comprise the first host receiving a request to monitor a packet flow and triggering a telemetry process based on a predetermined event associated with the packet flow. The method may also comprise: in response to the triggered telemetry process and detecting an egress packet associated with the packet flow, generating an encapsulated packet by encapsulating the egress packet with an outer header; configuring a telemetry instruction in the outer header; and sending the encapsulated packet with the telemetry instruction to the second host via one or more intermediate network devices. The telemetry instruction may be configured to cause the one or more intermediate network devices to add, to the encapsulated packet, metadata associated with a network state experienced by the encapsulated packet.

18 Claims, 6 Drawing Sheets

(56) References Cited

U.S. PATENT DOCUMENTS

| | | | |
|---|---|---|---|
| 2016/0269482 A1* | 9/2016 | Jamjoom | H04L 43/0852 |
| 2016/0277953 A1* | 9/2016 | Andersson | H04L 41/5003 |
| 2017/0295100 A1 | 10/2017 | Hira et al. | |
| 2017/0295101 A1 | 10/2017 | Hira et al. | |
| 2018/0131617 A1 | 5/2018 | Hira | |
| 2019/0014394 A1* | 1/2019 | Anand | H04L 9/3242 |
| 2019/0058649 A1* | 2/2019 | Qi | H04L 41/0893 |
| 2019/0104075 A1* | 4/2019 | Li | H04L 45/02 |
| 2019/0288948 A1 | 9/2019 | Hira et al. | |
| 2020/0195553 A1* | 6/2020 | Yigit | H04L 43/0805 |
| 2020/0267059 A1* | 8/2020 | Mozumdar | H04L 43/50 |
| 2021/0006488 A1* | 1/2021 | Kikkawa | H04L 45/3065 |

OTHER PUBLICATIONS

V. Jeyakumar et al., "Millions of little minions: Using packets for low latency network programming and visibility", SIGCOMM' 14, Aug. 17-22, 2014. (Year: 2014).*

M. Mahalingam et al., "Virtual eXtensible Local Area Network (VXLAN) : A Framework for Overlaying Virtualized Layer 2 Networks over Layer 3 Networks", IETF RFC 7348, Aug. 2014.

Nanxi Kang et al., "Optimizing the "One Big Switch" Abstraction in Software-Defined Networks", CoNEXT'13, Dec. 9-12, 2013, ACM.

Mohammad Alizadeh et al., "On the Data Path Performance of Leaf-Spine Datacenter Fabrics", IEEE 21st Annual Symposium on High-Performance Interconnects, 2013, pp. 71-74.

Jonathan Perry et al., "Fastpass: A Centralized "Zero-Queue" Datacenter Network", SIGCOMM, 2014, pp. 307-318, ACM.

Vimalkumar Jeyakumar et al., "EyeQ: Practical Netwok Performance Isolation at the Edge", 10th USENIX Symposium on Networked System Design and Implementation (NSDI'13), 2013, pp. 297-311, USENIX Association.

Lucian Popa et al., "FairCloud: Sharing the Network in Cloud Computing", HotNets-X, (New York, NY, USA), pp. 22:1-22:6, ACM, 2011.

Mohammad Alizadeh et al., "pFabric: Minimal Near-Optimal Datacenter Transport", SIGCOMM'13, Aug. 12-16, 2013, ACM.

Mosharaf Chowdhury et al., "Efficient Coflow Scheduling with Varys", SIGCOMM'14, Aug. 17-22, 2014, ACM.

Mohammad Al-Fares et al., "Hedera: Dynamic Flow Scheduling for Data Center Networks", NSDI 2010, (Berkeley, CA, USA), USENIX Association.

Theophilus Benson et al., "MiceroTE: Fine Grained Traffic Engineering for Data Centers", CoNEXT 2011, Dec. 6-9, 2011, ACM.

Jiaxin Cao et al., "Per-packet Load-balanced, Low-Latency Routing for Clos-based Data Center Networks", CoNEXT 13, Dec. 9-12, 2013, pp. 49-60, ACM.

Srikanth Kandula et al., "Dynamic Load Balancing Without Packet Reordering", ACM SIGCOMM Computer Communication Review, Apr. 2007, pp. 53-62, No. 2, vol. 37.

Siddhartha Sen et al., "Scalable, Opimal Flow Routing in Datacenters via Local Link Balancing", CoNEXT'13, Dec. 9-12, 2013, ACM.

Mohammad Alizadeh et al., "CONGA: Distributed Congestion-Aware Load Balancing for Datacenters", SIGCOMM'14, Aug. 17-22, 2014, ACM.

Chi-Yao Hong et al., "Achieving High Utilization with Software-Driven WAN", SIGCOMM'13, Aug. 12-16, 2013, pp. 15-26, ACM.

Sushant Jain et al., "B4: Experience with a Globally-Deployed Software Defined WAN", SIGCOMM'13, Aug. 12-16, 2013, ACM.

Pat Bosshart et al., "Forwarding Metamorphosis: Fast Programmable Match-Action Processing in Hardware for SDN", SIGCOMM'13, Aug. 12-16, 2013, ACM.

International Search Report and Written Opinion of the International Searching Authority, International application No. PCT/US2017/027190, dated Jun. 9, 2017.

"Cavium and XPliant Introduce a Fully Programmable Switch Silicon Family Scaling to 3.2 Terabits per Second", News & Evnet, Retrieved on Aug. 24, 2017 from the Internet at <URL: http://tinyurl.com/nzbqtr3>.

Pat Bosshat et al., "P4: Programming Protocal-Independent Packet Processors", ACM SIGCOMM Computer Communication Review, Jul. 2014, pp. 88-95, No. 3, vol. 44.

Naga Katta et al., "HULA: Scalable Load Balancing Using Programmable Data Planes", SOSR'16, Mar. 14-15, 2016, ACM.

Radhika Niranjan Mysore et al., "PortLand: A Scalable Fault-Tolerant Layer 2 Data Center Network Fabric", SIGCOMM'09, Aug. 17-21, 2009, ACM.

"Cisco's Massively Scalable Data Center", Sep. 2015, Retrieved from <URL: http://www.cisco.com/c/dam/en/us/td/docs/solutions/Enterprise/Data_Center/MSDC/1-/MSDC_AAG_1.pdf>.

"BCM56850 Series: High-Capacity StrataXGS Trident II Et ernet Switc Series", Broadcom, Retrieved on Aug. 25, 2017 from the Internet at <URL: http://www.broadcom.com/products/Switching/Data-Center/BCM56850-Series>.

Shuihai Hu et al., "Explicit Path Control in Commodity Data Centers: Design and APplications", Proceedings of the 12th USENIX Symposium on Networked Systems Design and Implementation (NSDI'15), May 4-6, 2015, pp. 15-28.

Albert Greenberg et al., "VL2: A Scalable and Flexible Data Center Network", SIGCOMM'09, Aug. 17-21, 2009, ACM.

Chuanxiong Guo et al., "BCube: A High Performance, Server-centric Network Architecture for Modular Data Centers", SIGCOMM'09, Aug. 17-21, 2009, pp. 63-74, ACM.

Eleftheria Athanasopoulou et al., "Backpressure-based Packet-by-Packet Adaptive Routing in Communication Networks", IEEE/ACM Trans. Netw., vol. 21, pp. 244-257, Feb. 2013.

Baruch Awerbuch et al., "A Simple Local-Control Approximation Algorithm for Multicommodity Flow", Proceedings of the 34th IEEE Conf. on Found. of Computer Science, Oct. 1993.

"The P4 Language Specification", The P4 Language Consortium—Version 1.1.0, Nov. 18, 2015, pp. 109.

Sivasankar Radhakrishnan et al., "Dahu: Commodity Switches for Direct Connect Data Center Networks", ANCS, 2013, pp. 59-70, IEEE Press.

Anirudh Sivaraman et al., "Packet Transactions: A Programming Model for Data-Plane Algorithms at Hardware Speed", CoRR, 2015.

"Protocol-independent Switch Architecture," Jun. 4, 2015, Retrieved from the Internet at <URL: http://schd.ws/hosted_files/p4workshop2015/c9/NickM-P4-Workshop-June-04-2015.pdf>.

"Members of the p4 consortium", Retrieved from Internet at <URL: http://p4.org/join-us/>.

Anirudh Sivaraman, "P4's Action-execution Semantics and Conditional Operators," Massachusetts Institute of Technology, Retrieved from the Internet at <URL: https://github.com/anirudhSK/p4-semantics/raw/master/p4-semantics.pdf>.

Mohammad Alizadeh et al., Data Center TCP (DCTCP), SIGCOMM'10, Aug. 30-Sep. 3, 2010, ACM.

Keqiang He et al., "Presto: Edge-based Load Balancing for Fast Datacenter Networks", SIGCOMM'15, Aug. 17-21, 2015, ACM.

Costin Raiciu et al., "Improving Datacenter Performance and Robustness with Multipath TCP", SIGCOMM'11, Aug. 15-19, 2011, pp. 266-277, ACM.

Wei Bai et al., "Information-Agnostic Flow Scheduling for Commodity Data Centers", NSDI'15, 2015, pp. 455-468, USENIX Association.

David Zats et al., "DeTail: Reducing the Flow Completion Time Tail in Datacenter Networks", SIGCOMM'12, Aug. 13-17, 2012, pp. 139-150, ACM.

Srikanth Kandula et al., "Walking the Tightrope: Responsive Yet Stable Traffic Engineering", SIGCOMM'05, Aug. 21-26, 2005, ACM.

Anwar Elwalid et al., "MATE: MPLS Adaptive Traffic Engineering", IEEE INFOCOM, 2001.

Nithin Michael et al., "HALO: Hop-by-Hop Adaptive Link-State Optimal Routing", IEEE/ACM Transactions on Networking, Dec. 2015, pp. 1862-1875, No. 6, vol. 23.

Nathan Farrington et al., "Data Center Switch Architecture in the Age of Merchant Silicon", 17th IEEE Symposium on High Performance Interconnects, 2009, pp. 93-102.

Zhiruo Cao et al., "Performance of Hasing-Based Schemes for Internet Load Balancing", IEEE Infocom, 2000, pp. 332-341.

(56) References Cited

OTHER PUBLICATIONS

Communication Pursuant To Article 94(3) EPC, Application No. 17 719 462.8-1216, dated Oct. 9, 2019.

* cited by examiner

PACKET FLOW MONITORING IN SOFTWARE-DEFINED NETWORKING (SDN) ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, various network-related problems may occur, which adversely affects the performance of hosts and VMs in in the SDN environment.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to network troubleshooting and debugging will now be explained in more detail using FIG. 1, which is a schematic diagram illustrating example Software-Defined Networking (SDN) environment 100 in which packet flow monitoring may be performed. It should be understood that, depending on the desired implementation, SDN environment 100 may include additional and/or alternative components than that shown in FIG. 1.

Figure 1:
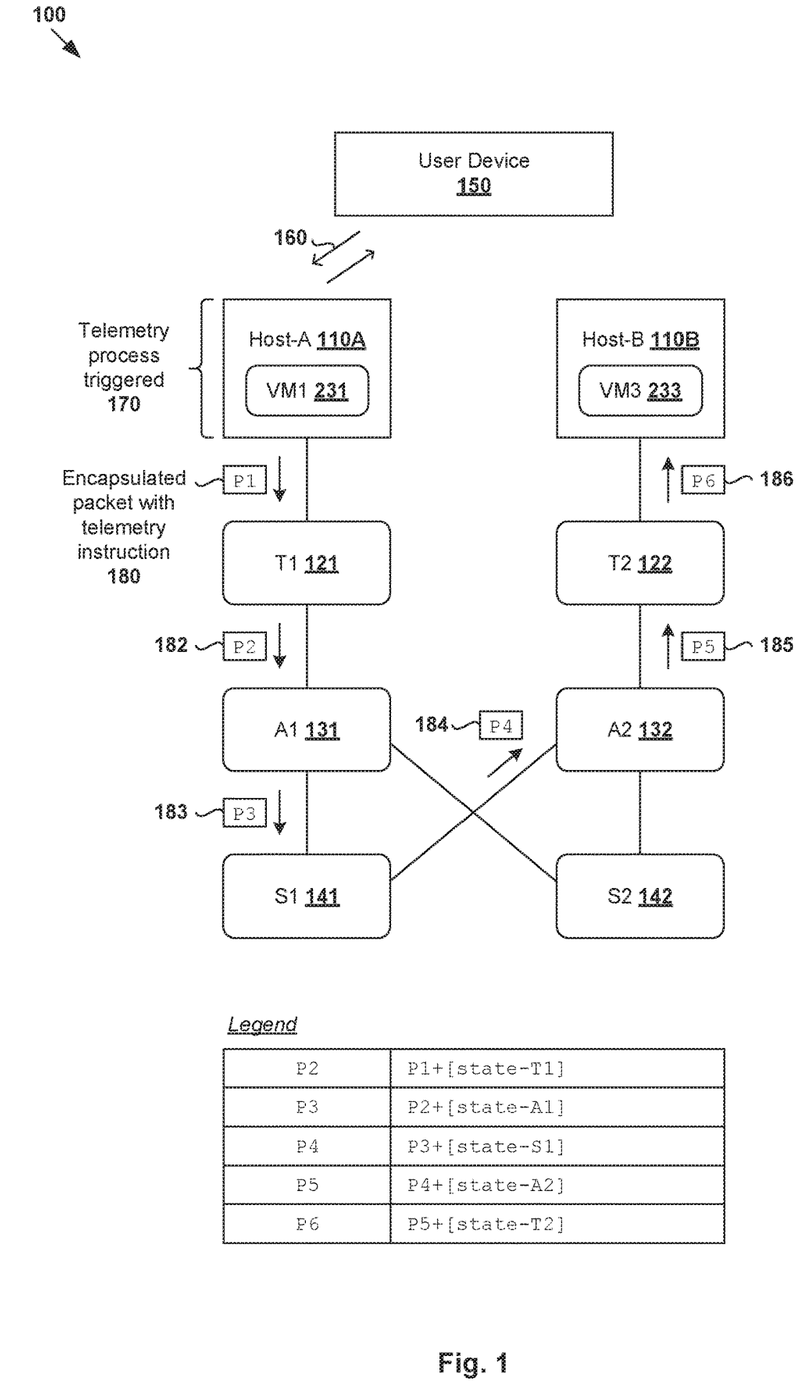
FIG. 1 is a schematic diagram illustrating an example Software-Defined Networking (SDN) environment in which packet flow monitoring may be performed.

In the example in FIG. 1, SDN environment 100 includes host-A 110A ("first host") and host-B 110B ("second host") that are connected via multiple intermediate network devices, such as network switches labelled "T1" 121, "A1" 131, "S1" 141, "S2" 142, "A2" 132 and "T2" 122. In the example network topology shown, the switches form two alternative forwarding paths between host-A 110A and host-B 110B. A first forwarding path is provided by "T1" 121, "A1" 131, "S1" 141, "A2" 132 and "T2" 122, while a second forwarding path is provided by "T1" 121, "A1" 131, "S2" 142, "A2" 132 and "T2" 122.

Although two alternative forwarding paths are shown in FIG. 1 for simplicity, the number of forwarding paths depends on the number of inter-connected switches and the topology of SDN environment 100, such as a multi-rooted topology (e.g., leaf-spine topology, fat-tree topology, etc.) that provides bisection bandwidth. As used herein, the term "intermediate network device" may refer generally to any suitable network element configured to receive and forward packets, such as layer-2 switch, layer-3 router, gateway, bridge, etc. The "intermediate network device" may be a physical network device (e.g., physical switch, physical router, etc.) or logical network device (e.g., logical switch, logical router, etc.). Depending on the network topology, a "switch" may be a physical switch or software-implemented switch, top-of-rack (ToR) switch, aggregate switch, spine switch, etc. The term "layer-2" generally refers to a Media Access Control (MAC) layer and "layer-3" to a network or Internet Protocol (IP) layer in the Open System Interconnection (OSI) model, although the concepts described herein may be applicable to other networking models.

Hosts 110A-B will be explained in more detail using FIG. 2, which is a schematic diagram illustrating physical implementation view 200 of example SDN environment 100 in FIG. 1. Depending on the desired implementation, physical implementation view 200 may include additional and/or alternative component(s) than that shown in FIG. 2. In the example in FIG. 2, hosts 110A-B (also known as "end hosts," "computing devices", "host computers", "host devices", "physical servers", "server systems", "physical machines" etc.) each include virtualization software (e.g., hypervisor 214A/214B) that maintains a mapping between underlying hardware 212A/212B and virtual resources allocated to VMs 231-234. Hosts 110A-B are interconnected via physical network 205 formed by various intermediate network devices, such as ToR switches 121-122, aggregate switches 131-132 and spine switches 141-142 in FIG. 1.

Hardware 212A/212B includes suitable physical components, such as processor(s) 220A/220B; memory 222A/222B; physical network interface controller(s) or NIC(s) 224A/224B; and storage disk(s) 228A/228B accessible via storage controller(s) 226A/226B, etc. Virtual resources are allocated to each VM to support a guest operating system (OS) and applications (see 235-238). Corresponding to hardware 212A/212B, the virtual resources may include virtual CPU, virtual memory, virtual disk, virtual network interface controller (VNIC), etc. Hardware resources may be emulated using virtual machine monitors (VMMs) 241-244, which may be considered as part of (or alternatively separated from) corresponding VMs 231-234. For example in FIG. 2, VNICs 251-254 are emulated by corresponding VMMs 241-244.

Although examples of the present disclosure refer to virtual machines, it should be understood that a "virtual machine" running on a host is merely one example of a "virtualized computing instance." or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 214A/214B further implements virtual switch 215A/215B and logical distributed router (DR) instance 217A/217B to handle egress packets from, and ingress packets to, corresponding VMs 231-234. In SDN environment 100, logical switches and logical distributed routers may be implemented in a distributed manner and can span multiple hosts to connect VMs 231-234. For example, logical switches that provide logical layer-2 connectivity may be implemented collectively by virtual switches 215A-B and represented internally using forwarding tables 216A-B at respective virtual switches 215A-B. Forwarding tables 216A-B may each include entries that collectively implement the respective logical switches. Further, logical distributed routers that provide logical layer-3 connectivity may be implemented collectively by DR instances 217A-B and represented internally using routing tables 218A-B at respective DR instances 217A-B. Routing tables 218A-B may be each include entries that collectively implement the respective logical distributed routers.

A logical router may be a logical distributed router (DR), logical service routers (SR), or a combination of both. A DR represents a distributed routing component that is deployed to provide routing services for virtualized computing instances to which the DR is connected. A DR may be implemented in a distributed manner in that it may span multiple hosts that support those virtualized computing instances. An SR (also known as an edge node) represents a centralized routing component that is deployed to provide centralized stateful services, such as firewall protection, load balancing, network address translation (NAT), etc.

Packets may be received from, or sent to, each VM via an associated logical port. For example, logical ports 261-264 are associated with respective VMs 231-234. Here, the term "logical port" may refer generally to a port on a logical switch to which a virtualized computing instance is connected. A "logical switch" may refer generally to a software-defined networking (SDN) construct that is collectively implemented by virtual switches 215A-B in the example in FIG. 1, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them). The term "packet" may refer generally to a group of bits that can be transported together from a source to a destination, such as message, segment, datagram, etc.

A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. To facilitate communication among VMs located on the same logical overlay network, hosts 110A-B maintain data-plane connectivity with each other, and other hosts not shown in FIG. 2, via physical network 205. Hypervisor 214A/214B may implement a virtual tunnel endpoint (VTEP) to encapsulate and decapsulate packets with an outer header (also known as a tunnel header) identifying the relevant logical overlay network (e.g., VNI=6000). For example in FIG. 2, hypervisor-A 214A implements first VTEP associated with (IP address=IP-A, MAC address=MAC-A, VTEP label=VTEP-A), and hypervisor-B 114B implements a second VTEP with (IP-B, MAC-B, VTEP-B).

Figure 2:
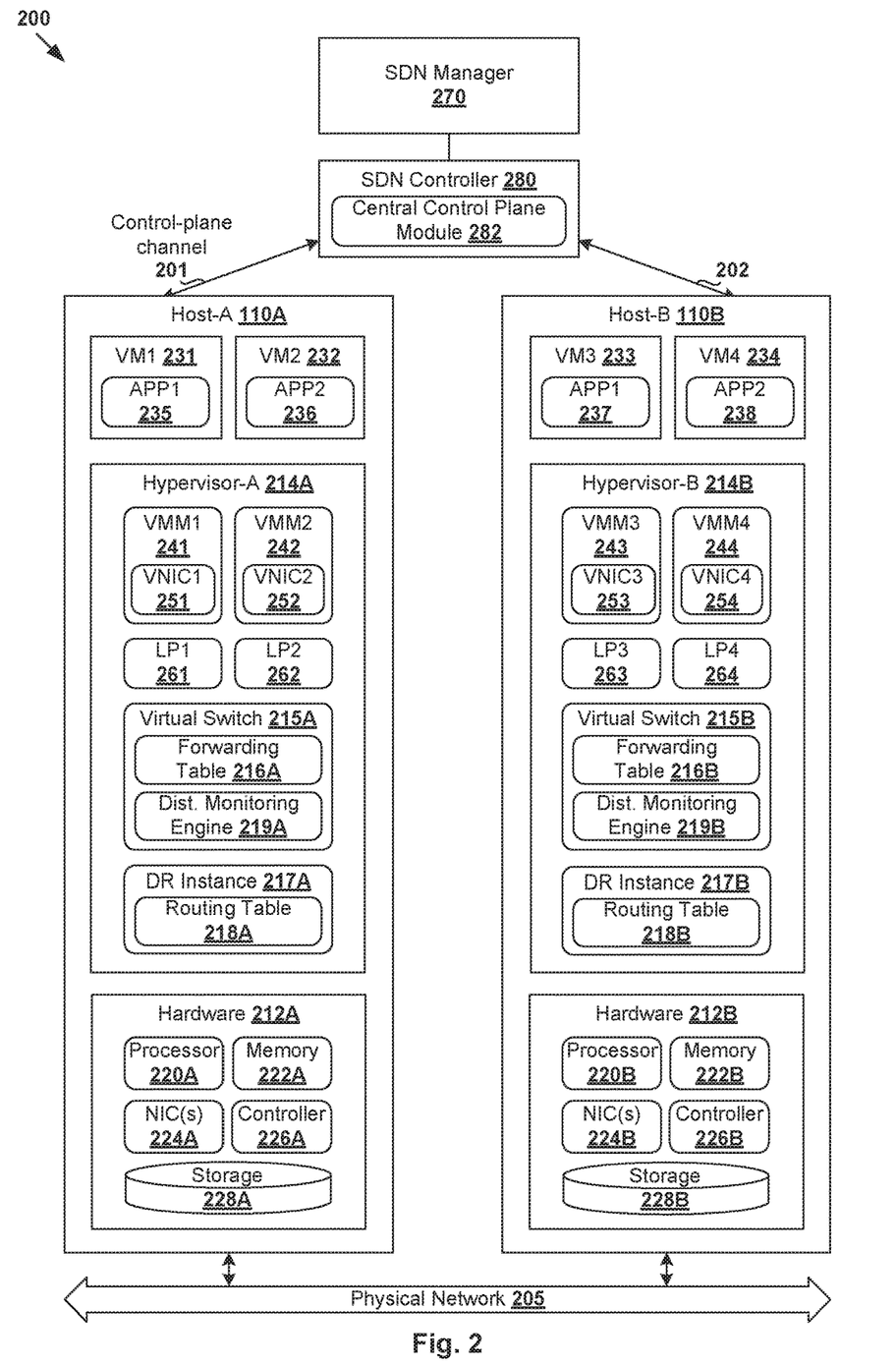
FIG. 2 is a schematic diagram illustrating a physical implementation view of the SDN environment in FIG. 1.

Further in FIG. 2, SDN manager 270 and SDN controller 280 are example network management entities that facilitate implementation of software-defined networks (e.g., logical overlay networks). One example of an SDN controller is the NSX controller component of VMware NSX® (available from VMware, Inc.) that operates on a central control plane. SDN controller 280 may be a member of a controller cluster (not shown for simplicity) that is configurable using SDN manager 270 operating on a management plane. Network management entity 270/280 may be implemented using physical machine(s), VM(s), or both. Logical switches, logical routers, and logical overlay networks may be configured using SDN manager 270, SDN controller 280, etc. To send or receive control information, a local control plane (LCP) agent (not shown for simplicity) on host 110A/110B may interact with central control plane module 282 at SDN controller 280 via control-plane channel 201/202.

In practice, the performance of hosts 110A-B and VMs 231-234 may be adversely affected by various network-related problems in SDN environment 100. In this case, users (e.g., network administrators) usually have to identify the source(s) or origin(s) of the problems for network troubleshooting and debugging purposes. Conventionally, however, some users rely on primitive tools to perform network debugging and troubleshooting, such as ping, traceroute, etc. For example, ping is a utility for testing the reachability of a computer system, while traceroute is diagnostic tool to display the path of a packet from one computer system to another. Both tools rely on injecting traffic into the network to perform the necessary measurements.

Primitive tools such ping and traceroute have a number of disadvantages. For example, these tools generally rely on Internet Control Message Protocol (ICMP) messages. With the increasing use of fat tree topologies and multipath routing (e.g., using equal-cost multi-path routing (ECMP), etc.) in data center networks, these ICMP messages may not take the same path in the network as traffic from applications that require monitoring. Further, existing traceroute and enhanced implementations (e.g., Paris Traceroute) are useful for monitoring packet loss, but do not provide any additional information relating to the network state(s) experienced by packets.

Packet Flow Monitoring

According to examples of the present disclosure, a data-plane telemetry process may be triggered to facilitate packet flow monitoring. In particular, hosts 110A-B may rely on the telemetry capabilities of intermediate network device(s) to improve packet flow monitoring in SDN environment 100. Using a data-plane approach, a telemetry instruction may be added to data packets to cause the intermediate network device(s) to add metadata to the data packets as they are traversing through the network. This way, the metadata may be used for manual and/or automatic network troubleshooting and debugging purposes, such as to monitor network performance and/or debug transient application performance issues (e.g., high latency, low throughput, high packet loss, etc.).

Figure 3:
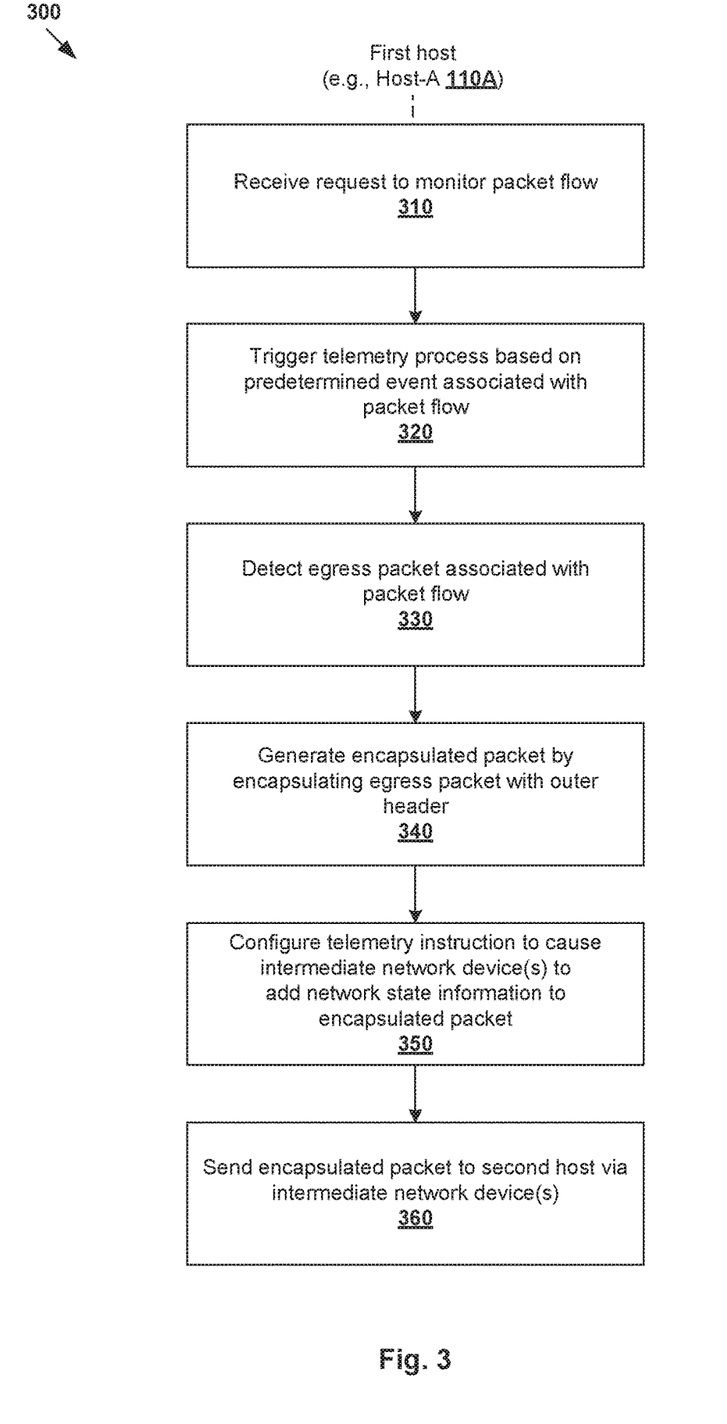
FIG. 3 is a flowchart of an example process for a first host to perform packet flow monitoring in an SDN environment.

In more detail, FIG. 3 is a flowchart of example process 300 for a first host to perform packet flow monitoring in SDN environment 100. Example process 300 may include one or more operations, functions, or actions illustrated by one or more blocks, such as 310 to 340. The various blocks may be combined into fewer blocks, divided into additional blocks, and/or eliminated depending on the desired implementation. In practice, example process 300 may be implemented by host 110A/110B using any suitable component(s), such as distributed monitoring engine 219A/219B at virtual switch 215A/216B supported by hypervisor 114A/114B, etc. Throughout the present disclosure, it should be understood that although the terms "first" and "second" are used to describe various elements, these elements should not be limited by these terms. These terms are used to distinguish one element from another. For example, a first element may be referred to as a second element, and vice versa.

At 310 in FIG. 3, host-A 110A ("first host") receives a request to monitor a packet flow between VM1 231 ("first virtualized computing instance") supported by host-A 110A and VM3 233 ("second virtualized computing instance") supported by host-B 110B ("second host"). For example in FIG. 1, request 160 may be received from user device 150 operated by a user (e.g., network administrator). As will be described further using FIG. 4 to FIG. 6, request 160 may specify five-tuple information associated with the packet flow and a performance threshold associated with a performance metric. Any suitable "performance metric" may be used, such as latency, throughput, packet loss, packet size, jitter, total transmitted or received units of data (bytes), any combination thereof, etc.

At 320 in FIG. 3, host-A 110A triggers a telemetry process based on a predetermined event associated with the packet flow. For example in FIG. 1, based on request 160, host-A 110A may monitor the packet flow by comparing a performance metric (e.g., latency) associated with the packet flow with a performance threshold (e.g., threshold=50 ms) specified by request 160. In this case, the predetermined event may be detected in response to determination that the performance metric does not satisfy the performance threshold. See corresponding 170 in FIG. 1.

At 330 and 340 in FIG. 3, in response to the triggered telemetry process and detecting an egress packet associated with the packet flow, host-A 110A generates an encapsulated packet by encapsulating the egress packet with an outer header that is addressed from host-A 110A to host-B 110B. Further, at 350 and 360, host-A 110A configures a telemetry instruction in the outer header before sending the encapsulated packet to host-B 110B via intermediate network devices, such as switches 121-122, 131-132, 141-142 in FIG. 1. See corresponding 180 in FIG. 1.

The "telemetry instruction" is an instruction to cause the intermediate network devices to add, to the encapsulated packet, metadata associated with a network state experienced by the encapsulated packet as it traverses from host-A 110A to host-B 110B. As used herein, the term "metadata" associated with may refer generally to any suitable information indicating a network state experienced by a packet. In practice, the metadata may include device-level information (e.g., switch_ID in FIG. 1), ingress port information (e.g., ingress port ID denoted as port_in), egress port information (e.g., egress port ID denoted as port_out), buffer information, etc. Various examples will be discussed using FIG. 4 to FIG. 6.

In the example in FIG. 1, encapsulated packet 180 may be forwarded via switches 121-122, 131-132, 141. In this case, as encapsulated packet 180 is forwarded, "T1" 121 may add metadata="state-T1" (see 182) to encapsulated packet 180, "A1" 131 may add metadata="state-A1" (see 183), "S1" 141 may add metadata="state-S1" (see 184), "A2" 132 may add metadata="state-A2" (see 185), and "T2" 122 may add metadata="state-T2" (see 186) before reaching host-B 110B. Depending on the desired implementation, a telemetry instruction may be configured in encapsulated packet 180 to cause host-B 110B to send the metadata to host-A 110A. For example, using sink-to-source reporting, host-A 110A may receive the metadata from host-B 110N, and store the metadata in a local storage (e.g., disks 228A and/or memory 222A). Host-A 110A may then retrieve the metadata from the local storage, before reporting and sending a response that includes the metadata to user device 160 to facilitate a troubleshooting operation associated with the packet flow.

Examples of the present disclosure should be contrasted against conventional control-plane approaches that are relatively costly to implement and lack scalability. For example, these control-plane approaches usually necessitate the deployment of centralized and complex analytic platforms and monitoring servers to collect information from different entities and perform network monitoring and troubleshooting. The implementation overhead generally increases with the size of the data center. For example, a large data center would need a large cluster of monitoring servers that operate together as an analytic engine. In contrast, the data-plane approach according to examples of the present disclosure has relatively lower overhead and generally does not have deployment issues associated with the control-plane approaches.

Further, examples of the present disclosure may ameliorate scalability problems associated with conventional control-plane approaches. For example, if network switches are required to generate and send reports to the central control plane on a per-packet basis, the volume of reports generally becomes extremely large. Also, due to its centralized nature, the control-plane approach may react slower to performance issues, etc. In contrast, the data-plane approach according to examples of the present disclosure facilitates tracking of rapidly changing network states experienced by packets, thereby reducing the likelihood of sub-optimal troubleshooting decisions based on stale information. In the following, detailed examples will be explained using FIG. 4 to FIG. 6.

Detailed Example

Figure 4:
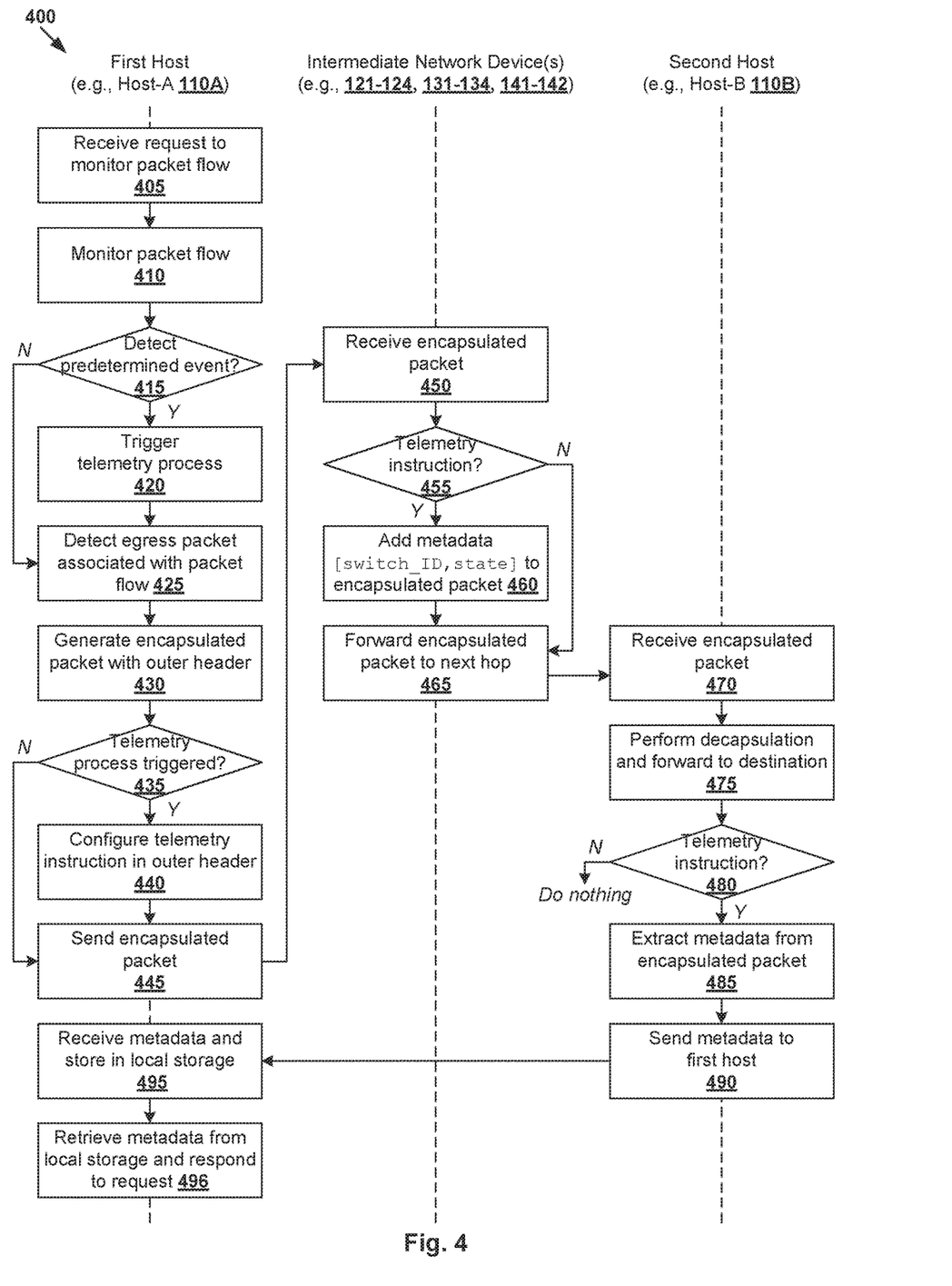
FIG. 4 is a flowchart of an example detailed process for packet flow monitoring in an SDN environment.

FIG. 4 is a flowchart of example detailed process 400 for packet flow monitoring in SDN environment 100. Example process 400 may include one or more operations, functions, or actions illustrated at 405 to 496. The various operations, functions or actions may be combined into fewer blocks, divided into additional blocks, and/or eliminated depending on the desired implementation. Example process 400 may be implemented by host 110A/110B using any suitable component(s), such as virtual switch 215A/215B or more particularly distributed monitoring engine 219A/219B, etc.

The example in FIG. 4 will be explained using FIG. 5, which is a schematic diagram illustrating first example packet flow monitoring 500 in an SDN environment according to the example in FIG. 4. Similar to the example in FIG. 3, an example "first host" will be explained using host-A 110A, an example "second host" using host-B 110B and example "intermediate network devices" using switches 121-122, 131-132, 141-142 connecting host-A 110A and host-B 110B.

(a) Configuration

At 405 in FIG. 4, host-A 110A receives a request to monitor a packet flow, such as by detecting a predetermined event associated with a packet flow. The request may be configured by a user (e.g., network administrator) operating user device 150 via any suitable user interface, such as graphical user interface (GUI), command-line interface (CLI), application programming interface (API) calls, etc. The user interface may be supported by host-A 110A, SDN manager 270 or SDN controller 280, or any combination thereof.

Figure 5:
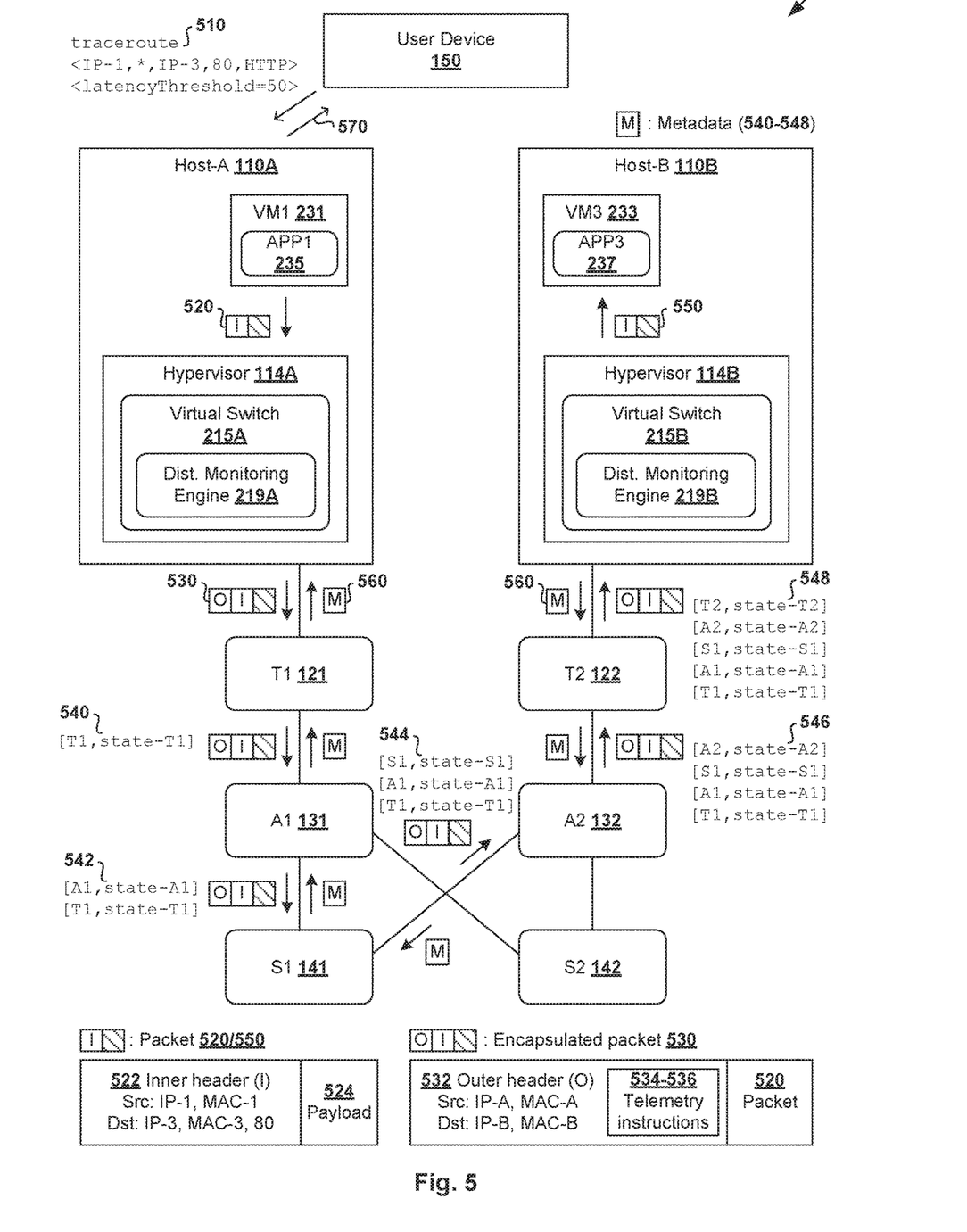
FIG. 5 is a schematic diagram illustrating a first example packet flow monitoring in an SDN environment according to the example in FIG. 4.

In the example in FIG. 5, host-A 110A receives an request (see 510) to monitor a packet flow between VM1 231 and VM3 233 to detect whether an associated performance metric satisfies a predetermined threshold. As explained using FIG. 1 to FIG. 3, the performance metric may be include latency, throughput, packet loss, packet size, jitter, total transmitted or received units of data (bytes), any combination thereof, etc. For example, latency may refer generally to the time required to transmit a packet belonging to the flow from a sender to a recipient, such as round trip time (RTT), one-way latency, etc. Throughput may refer generally to the amount of data being sent from the sender to the recipient, such as the quantity of data per unit of time. Packet loss may refer generally to the number of packets lost per a fixed number (e.g., 100) of packets sent. Jitter may refer generally to a variance in latency over time.

Example request 510 in FIG. 5 is to configure host-A 110A to monitor the latency of the packet flow between VM1 231 and VM3 233, such as an enhanced traceroute command="traceroute<IP-1, *, IP-3, 80, HTTP> <latencyThreshold=50>." Unlike conventional traceroute commands, it should be understood that request 510 is an enhanced traceroute command to trigger network telemetry for the packet flow (to be explained further below). The packet flow to be monitored may be identified using 5-tuple information that includes source IP address=IP-1 associated with VM1 231, source port number=any, destination IP address=IP-3 associated with VM3 233, destination port number=80, protocol=HyperText Transfer Protocol (HTTP), etc. In practice, a protocol may be identified based on its assigned port number, such as 22 for Secure Shell (SSH), 21 for File Transfer Protocol (FTP), 53 for Domain Name Service (DNS), etc. Example request 510 further specifies the predetermined event to be detected using a performance threshold, such as latency threshold=50 ms, etc.

(b) Triggering Network Telemetry Process

At 410 in FIG. 4, based on the configuration at block 405, host-A 110A monitors the packet flow, such as by comparing a performance metric with the performance threshold specified in request 510, etc. In practice, block 410 may involve host-A 110A measuring the performance metric using any suitable approach. For example, host-A 110A may monitor TCP sequence numbers associated with the packet flow, and TCP sequence numbers in acknowledgement (ACK) packets host-A 110A receives from host-B 110B in the reverse direction, etc. At 415 in FIG. 4, in response to detecting the predetermined event associated with the packet flow, host-A 110A triggers a telemetry process to collect metadata or network state information associated with the packet flow. Otherwise, the network telemetry process is not triggered (see arrow from 415 to 425).

In the example in FIG. 5, consider the scenario where a telemetry process is triggered in response to detecting that the latency of a packet flow exceeds threshold=50 ms. The packet flow may be between first application "APP1" 235 executed by VM1 231 and second application "APP2" 237 executed by VM3 233. In this case, the telemetry instructions are to collect metadata associated with the packet flow. In particular, according to 425 and 430 in FIG. 4, in response to detecting egress packet 520 associated with the packet flow, host-A 110A generates encapsulated packet 530 by encapsulating egress packet 520 with outer header 532.

Egress packet 520 includes payload 524 and inner header 522 specifying (source IP=IP-1, source MAC=MAC-1) associated with VM1 231 and (destination IP=IP-3, destination MAC=MAC-3, destination port number=80) associated with VM3 233. Encapsulated packet 530 includes egress packet 520 and outer header 532 specifying (source VTEP IP=IP-A, MAC=MAC-A) associated with host-A 110A and (destination VTEP IP=IP-B, MAC=MAC-B) associated with host-B 110B. In practice, outer header 532 may also specify logical overlay network information, such as VNI=5000 of a logical overlay network connecting VM1 231 and VM3 233.

At 435 and 440 in FIG. 4, since a telemetry process is triggered, host-A 110A configures telemetry instructions 534-536 in encapsulated packet 530. First telemetry instruction 534 is to cause intermediate network devices 121-122, 131-132, 141-142 to collect and add metadata to encapsulated packet 530 as it is being forwarded from host-A 110A to host-B 110B. Second telemetry instruction 536 is to cause destination host-B 110B to extract and send the metadata to source host-A 110A (also known as sink-to-source reporting). At 445 in FIG. 4, host-A 110A sends encapsulated packet 530 to host-B 110B via physical network 205.

Any suitable format may be used for telemetry instructions 534-536. For example, Inband Network Telemetry (INT) is a framework designed to allow the collection and reporting of network state information, by the data plane, without requiring any intervention of the control plane. In this case, INT headers may be added to encapsulated packet 530 to store telemetry instructions 534-536 and source_ID= [host-A] to identify source host-A 110A. In practice, an INT header type 1 (i.e., hop-by-hop type) may be added to store first telemetry instruction 534, while an INT header type 2 (i.e., destination-type) may be added to store second telemetry instruction 536.

According to the INT architectural model, first telemetry instruction 534 in FIG. 5 may be encoded as a bitmap where each bit corresponds to a particular type of metadata to be added into encapsulated packet 530. Depending on the desired implementation, first telemetry instruction 534 may specify any suitable metadata to be added, such as device-level information, ingress port information, egress port information, buffer information, any combination thereof, etc. For example, device-level information may include a switch ID (denoted as switch_ID) that is unique within a management domain, etc. Ingress port information may include an ingress port ID (denoted as port_in) via which the probe packet is received, ingress timestamp, ingress port receive (RX) packet count, ingress port RX byte count, ingress port drop count, ingress port RX utilization, or any combination thereof, etc.

Egress port information may include an egress port ID (denoted as port_out) via which the probe packet is sent, egress timestamp, hop latency (i.e., time taken for the packet to be switched within the network device), egress port transmit (TX) packet count, egress port TX byte count, egress port drop count, egress port TX link utilization (i.e., current utilization of the egress port), or any combination thereof, etc. Intermediate network devices may keep track of the current link utilization using any suitable mechanism, such as bin bucketing, moving average, etc. Buffer information may include a queue ID, queue occupancy information (instantaneous queue length, average queue length, etc.), queue congestion status (e.g., used buffer space relative to maximum buffer space), queue drop count, or any combination thereof, etc.

(c) Telemetry Instruction Processing

At 450 and 455 in FIG. 4, in response to receiving encapsulated packet 530, each intermediate network device detects and processes first telemetry instruction 534 in outer header 532. Further, at 460 and 465, the intermediate network device modifies encapsulated packet 530 to add the relevant metadata based on first telemetry instruction 534 before forwarding it to the next hop. It should be understood that, in practice, it is not necessary for each and every intermediate network device along a path between host-A 110A and host-B 110B to be capable of processing first telemetry instruction 534, nor adding metadata to encapsulated packet 530 accordingly.

In the example in FIG. 5, encapsulated packet 530 is forwarded via various telemetry-capable intermediate network devices 121-122, 131-132, 141. Based on first telemetry instruction 534 (e.g., bitmap), first metadata=[switch_ID=T1, state-T1] may be added by "T1" 121 (see 540); second metadata=[switch_ID=A1, state-A1] by "A1" 131 (see 542); third metadata=[switch_ID=S1, state-S1] by "S1" 141 (see 544); fourth metadata=[switch_ID=A2, state-A2] by "A2" 132 (see 546); and fifth metadata=[switch_ID=T2, state=state-T2] by "T2" 142 (see 548). Here, "state-T1" represents metadata added by corresponding "T1" 121, "state-A1" represents metadata added by "A1" 131, and so on.

At 470 and 475 in FIG. 4, in response to receiving encapsulated packet 530 to which metadata 540-548 has been added, host-B 110B performs decapsulation to remove outer header 532 and forwards decapsulated packet 550 to destination VM3 233. Further, at 480, 485 and 490 in FIG. 4, in response to detecting and processing second telemetry instruction 536, host-B 110B extracts metadata 540-548 from outer header 532, and sends metadata 540-548 to host-A 110A (see report labelled "M" 560).

(d) Troubleshooting Based on Metadata

At 495 in FIG. 4, in response to receiving report 560 from host-B 110B, source host-A 110A stores metadata 540-548 in any suitable local storage (e.g., storage disk 228A, memory 222A, etc.). At 496 in FIG. 4, in response to request 510 from user device 150, host-A 110A may generate and send a response (see 570 in FIG. 5) that includes metadata 540-548. This way, metadata 540-548 may be used by a user (e.g., network administrator) operating user device 150 to facilitate troubleshooting operations, etc. For example, the user may detect the source of the high latency (e.g., at "S1" 141).

According to examples of the present disclosure, metadata 540-548 may be used for end-to-end application monitoring (e.g., APP1 235 and APP3 237) without requiring any heavy-weight analytic engine. Acquiring metadata associated with packet flows opens up the possibility of a number of applications that may be implemented by hosts 110A-B. For example, the metadata may be used to facilitate continuous monitoring and fault reporting, debugging of application performance problems (e.g., caused by in physical network fabric 205 from a single pane of glass), intelligent routing or packet forwarding where routing decisions are driven by end hosts instead of intermediate network devices connecting them, etc.

It should be understood that automatic and/or manual network troubleshooting and debugging may be performed based on metadata 540-548. Examples of the present disclosure may be implemented together with packet forwarding and/or load balancing mechanisms, such as those described in U.S. patent application Ser. No. 15/485,089 (entitled "Virtual tunnel endpoints for congestion-aware load balancing"), Ser. No. 15/485,137 (entitled "Congestion-aware load balancing in data center networks") and Ser. No. 15/346,569 (entitled "Congestion-aware load balancing"), the content of which is incorporated herein by reference in its entirety. Examples of the present disclosure may also be implemented together with advanced congestion control, network data plane verification, etc.

Reverse Direction

The example in FIG. 4 will now be explained using FIG. 6, which is a schematic diagram illustrating second example packet flow monitoring 600 in an SDN environment according to the example in FIG. 4. In this case, packet flow monitoring may be performed for the reverse packet flow from host-B 110B (acting as a "first host" in FIG. 4) to host-A 110A (acting as a "second host" in FIG. 4).

Figure 6:
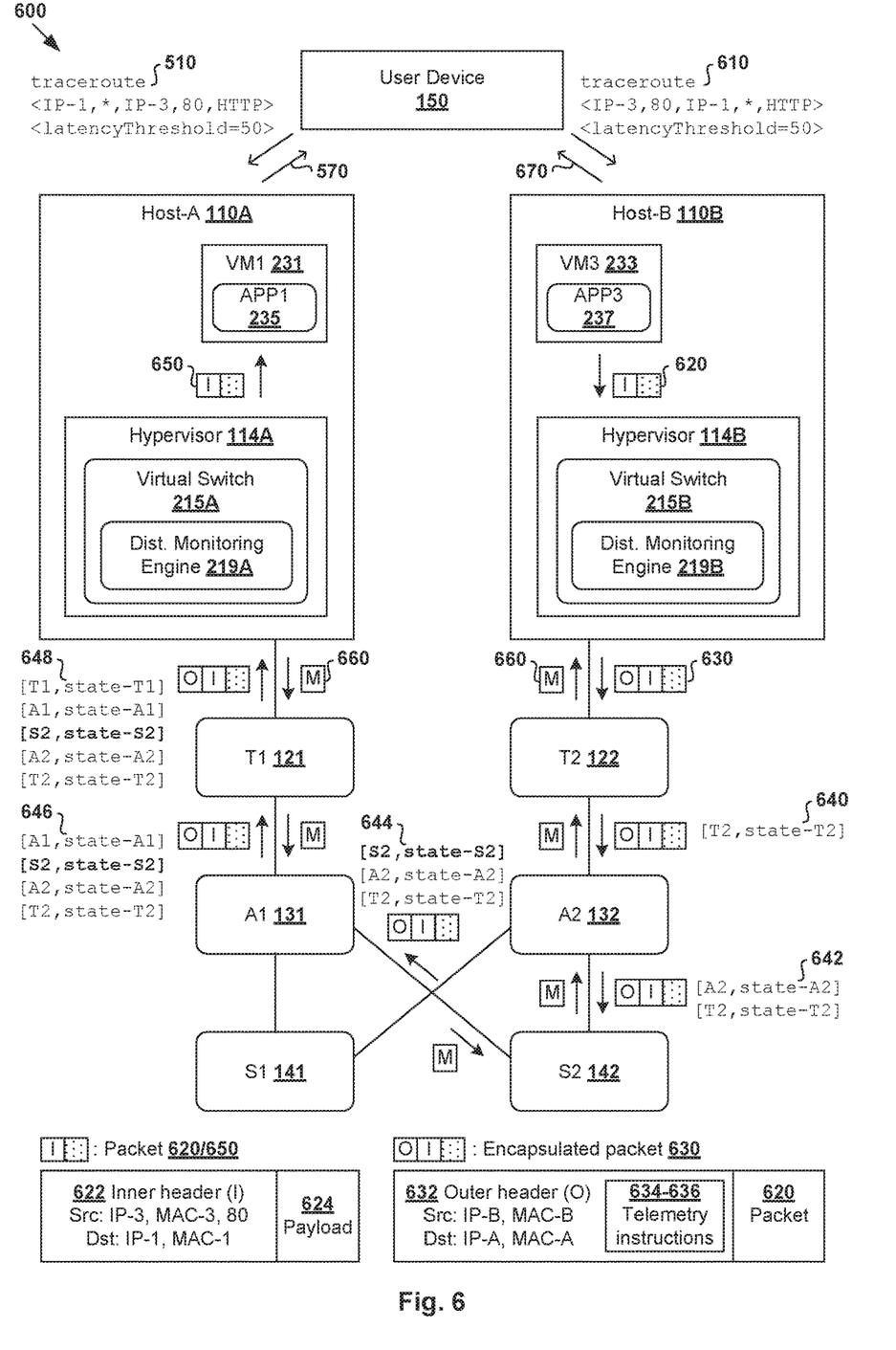
FIG. 6 is a schematic diagram illustrating a second example packet flow monitoring in an SDN environment according to the example in FIG. 4.

Referring to FIG. 6, in response to receiving example request 610 from user device 150, host-B 110B monitors the packet flow between VM1 231 and VM3 233. In this case, request 610 is an enhanced traceroute command="traceroute<source IP-3, source 80, destination IP-1, *, protocol=HTTP> <latencyThreshold=50>" to cause host-B 110B to detect whether a latency associated with the packet flow exceeds 50 ms ("predetermined event" in FIG. 2). If yes, a telemetry process will be triggered by host-B 110B. In response to the triggered telemetry process and detecting egress packet 620 with inner header 622 addressed from VM3 233 to VM1 231, host-B 110B generates encapsulated packet 630 and configures telemetry instructions 634-636 in outer header 632. See corresponding 405-445 in FIG. 4.

Based on first telemetry instruction 634 (e.g., bitmap), first metadata=[switch_ID=T2, state-T2] may be added by "T2" 122 (see 640); second metadata=[switch_ID=A2, state-A2] by "A2" 132 (see 642); third metadata=[switch_ID=S2, state-S2] by "S2" 142 (see 644); fourth metadata=[switch_ID=A1, state-A1] by "A1" 131 (see 646); and fifth metadata=[switch_ID=T1, state=state-T1] by "T1" 141 (see 648). Note that the reverse path (i.e., T2-A2-S2-A1-T1) via "S1" 141 in FIG. 6 is different to the forward path (i.e., T1-A1-S1-A2-T2) via "S2" 142 in FIG. 5. See corresponding 450-465 in FIG. 4.

Based on second telemetry instruction 636, host-A 110A extracts and reports metadata 640-648 back to host-B 110B (see feedback packet 660 in FIG. 6). Host-A 110A also performs decapsulation to remove outer header 632 before forwarding decapsulated packet 650 to VM1 231. See corresponding 470-490 in FIG. 4. This way, host-B 110B may receive and store metadata 640-648 in a local storage for later retrieval. For example, response 670 that includes metadata 640-648 may be sent to user device 150 responsive to request 610 to monitor the packet flow. See corresponding 495-496 in FIG. 4. Other implementation details explained using FIG. 5 are also applicable here and will not be repeated for brevity. Although illustrated using latency-related performance issue, any other suitable "predetermined event" may be configured to trigger the telemetry process.

Container Implementation

Although explained using VMs 231-234, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 231-234. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 6. For example, the instructions or program code, when executed by the processor of the computer system, may cause the processor to implement a "first host" to perform packet flow monitoring according to examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

I claim:

1. A method for a first host to perform packet flow monitoring in a software-defined networking (SDN) environment that includes the first host, a second host and one or more intermediate network devices connecting the first host and the second host, wherein the method comprises:
    receiving, by the first host, a request to monitor a packet flow including data packets between a first virtualized computing instance supported by the first host and a second virtualized computing instance supported by the second host;
    triggering, by the first host, a data-plane telemetry process based on a predetermined event associated with the packet flow, comprising:
        monitoring the packet flow by comparing a performance metric associated with the packet flow with a performance threshold specified by the request; and
        detecting the predetermined event in response to determination that the performance metric does not satisfy the performance threshold, wherein the data-plane telemetry process collects information associated with the packet flow; and
    in response to the triggered telemetry process and detecting an egress packet associated with the packet flow,
        generating, by the first host, an encapsulated packet by encapsulating the egress packet with an outer header that is addressed from the first host to the second host;
        configuring, by the first host, a telemetry instruction in the outer header to cause the one or more intermediate network devices to add, to the encapsulated packet, metadata associated with a network state experienced by the encapsulated packet; and
        sending, by the first host, the encapsulated packet with the telemetry instruction to the second host via the one or more intermediate network devices.

2. The method of claim 1, wherein the method further comprises:
receiving, from the second host, the metadata added to the encapsulated packet by the one or more intermediate network devices; and
storing the metadata in a local storage accessible by the first host.

3. The method of claim 2, wherein the method further comprises:
retrieving, from the local storage, the metadata; and
generating and sending, to a user device, a response that includes the metadata to facilitate a troubleshooting operation associated with the packet flow.

4. The method of claim 2, wherein configuring the telemetry instruction comprises:
configuring the telemetry instruction to cause the second host to send, to the first host, the metadata added to the encapsulated packet by the one or more intermediate network devices.

5. The method of claim 1, wherein receiving the request comprises:
receiving, from a user device, the request in the form of a command that specifies five-tuple information associated with the packet flow and the performance threshold.

6. The method of claim 1, wherein configuring the telemetry instruction comprises:
configuring the telemetry instruction to cause the one or more intermediate network devices to add one or more of the following metadata:
device-level information that includes a switch identifier (ID) to identify a particular intermediate network device;
ingress port information associated with the particular intermediate network device that includes one or more of the following: an ingress port ID, ingress timestamp, ingress port receive (RX) packet count, ingress port RX byte count, ingress port drop count, and ingress port RX utilization;
egress port information associated with the particular intermediate network device that includes one or more of the following: egress port ID, egress timestamp, hop latency, egress port transmit (TX) packet count, egress port TX byte count, egress port drop count, egress port TX link utilization; and
buffer information associated with the particular intermediate network device that includes one or more of the following: a queue ID, queue occupancy information, queue congestion status and queue drop count.

7. A non-transitory computer-readable storage medium that includes a set of instructions which, in response to execution by a processor of a first host, cause the processor to perform packet flow monitoring in a software-defined networking (SDN) environment that includes the first host, a second host and one or more intermediate network devices connecting the first host and the second host, wherein the method comprises:
receiving, by the first host, a request to monitor a packet flow including data packets between a first virtualized computing instance supported by the first host and a second virtualized computing instance supported by the second host;
triggering, by the first host, a data-plane telemetry process based on a predetermined event associated with the packet flow, comprising:
monitoring the packet flow by comparing a performance metric associated with the packet flow with a performance threshold specified by the request; and
detecting the predetermined event in response to determination that the performance metric does not satisfy the performance threshold, wherein the data-plane telemetry process collects information associated with the packet flow; and
in response to the triggered telemetry process and detecting an egress packet associated with the packet flow,
generating, by the first host, an encapsulated packet by encapsulating the egress packet with an outer header that is addressed from the first host to the second host;
configuring, by the first host, a telemetry instruction in the outer header to cause the one or more intermediate network devices to add, to the encapsulated packet, metadata associated with a network state experienced by the encapsulated packet; and
sending, by the first host, the encapsulated packet with the telemetry instruction to the second host via the one or more intermediate network devices.

8. The non-transitory computer-readable storage medium of claim 7, wherein the method further comprises:
receiving, from the second host, the metadata added to the encapsulated packet by the one or more intermediate network devices; and
storing the metadata in a local storage accessible by the first host.

9. The non-transitory computer-readable storage medium of claim 8, wherein the method further comprises:
retrieving, from the local storage, the metadata; and
generating and sending, to a user device, a response that includes the metadata to facilitate a troubleshooting operation associated with the packet flow.

10. The non-transitory computer-readable storage medium of claim 8, wherein configuring the telemetry instruction comprises:
configuring the telemetry instruction to cause the second host to send, to the first host, the metadata added to the encapsulated packet by the one or more intermediate network devices.

11. The non-transitory computer-readable storage medium of claim 7, wherein receiving the request comprises:
receiving, from a user device, the request in the form of a command that specifies five-tuple information associated with the packet flow and the performance threshold.

12. The non-transitory computer-readable storage medium of claim 7, wherein configuring the telemetry instruction comprises:
configuring the telemetry instruction to cause the one or more intermediate network devices to add one or more of the following metadata:
device-level information that includes a switch identifier (ID) to identify a particular intermediate network device;
ingress port information associated with the particular intermediate network device that includes one or more of the following: an ingress port ID, ingress timestamp, ingress port receive (RX) packet count, ingress port RX byte count, ingress port drop count, and ingress port RX utilization;
egress port information associated with the particular intermediate network device that includes one or more of the following: egress port ID, egress timestamp, hop latency, egress port transmit (TX) packet count, egress port TX byte count, egress port drop count, egress port TX link utilization; and buffer information associated with the particular intermediate network device that includes one or more of the following: a queue ID, queue occupancy information, queue congestion status and queue drop count.

13. A first host configured to perform packet flow monitoring in a software-defined networking (SDN) environment that includes the first host, a second host and one or more intermediate network devices connecting the first host and the second host, wherein the first host comprises:

a processor; and a non-transitory computer-readable medium having stored thereon instructions that, when executed by the processor, cause the processor to:

receive, by the first host, a request to monitor a packet flow including data packets between a first virtualized computing instance supported by the first host and a second virtualized computing instance supported by the second host;

trigger, by the first host, a data-plane telemetry process based on a predetermined event associated with the packet flow, comprising:

monitoring the packet flow by comparing a performance metric associated with the packet flow with a performance threshold specified by the request; and detecting the predetermined event in response to determination that the performance metric does not satisfy the performance threshold, wherein the data-plane telemetry process collects information associated with the packet flow; and in response to the triggered telemetry process and detecting an egress packet associated with the packet flow, generate, by the first host, an encapsulated packet by encapsulating the egress packet with an outer header that is addressed from the first host to the second host;

configure, by the first host, a telemetry instruction in the outer header to cause the one or more intermediate network devices to add, to the encapsulated packet, metadata associated with a network state experienced by the encapsulated packet; and send, by the first host, the encapsulated packet with the telemetry instruction to the second host via the one or more intermediate network devices.

14. The first host of claim 13, wherein the instructions further cause the processor to:

receive, from the second host, the metadata added to the encapsulated packet by the one or more intermediate network devices; and store the metadata in a local storage accessible by the first host.

15. The first host of claim 14, wherein the instructions further cause the processor to:

retrieve, from the local storage, the metadata; and generate and send, to a user device, a response that includes the metadata to facilitate a troubleshooting operation associated with the packet flow.

16. The first host of claim 14, wherein the instructions for configuring the telemetry instruction cause the processor to:

configure the telemetry instruction to cause the second host to send, to the first host, the metadata added to the encapsulated packet by the one or more intermediate network devices.

17. The first host of claim 13, wherein the instructions for receiving the request cause the processor to:

receive, from a user device, the request in the form of a command that specifies five-tuple information associated with the packet flow and the performance threshold.

18. The first host of claim 13, wherein the instructions further cause the processor to:

configure the telemetry instruction to cause the one or more intermediate network devices to add one or more of the following metadata:

device-level information that includes a switch identifier (ID) to identify a particular intermediate network device;

ingress port information associated with the particular intermediate network device that includes one or more of the following: an ingress port ID, ingress timestamp, ingress port receive (RX) packet count, ingress port RX byte count, ingress port drop count, and ingress port RX utilization;

egress port information associated with the particular intermediate network device that includes one or more of the following: egress port ID, egress timestamp, hop latency, egress port transmit (TX) packet count, egress port TX byte count, egress port drop count, egress port TX link utilization; and buffer information associated with the particular intermediate network device that includes one or more of the following: a queue ID, queue occupancy information, queue congestion status and queue drop count.

* * * * *